Oct. 3, 1967

R. A. COLLINS 3,345,272

MULTIPLE EFFECT PURIFICATION OF CONTAMINATED FLUIDS BY DIRECT GASEOUS FLOW CONTACT

United States Patent Office 3,345,272
Patented Oct. 3, 1967

3,345,272
MULTIPLE EFFECT PURIFICATION OF CONTAMINATED FLUIDS BY DIRECT GASEOUS FLOW CONTACT
Richard A. Collins, Tempe, Ariz., assignor to the United States of America as represented by the Secretary of the Interior
Filed May 14, 1965, Ser. No. 456,011
8 Claims. (Cl. 203—11)

ABSTRACT OF THE DISCLOSURE

Contaminated liquid purification is effectuated by heating the liquid below the boiling point thereof, and thereafter passing it countercurrent to gas in packed tower evaporators to produce gas-vapor mixtures which are channeled from a plurality of points along the packed tower of condensers obtaining pure liquid from the mixtures. The gas, which is maintained saturated with different moisture contents, is repeatedly recycled to absorb vapor from fresh contaminated liquid supplied to the evaporators, and release moisture in the condensers.

---

This invention relates to improvements in a method and apparatus for effectuating the economical extraction of pure liquids from impure liquids such as fresh water from brackish water or sea water. More specifically, it concerns a multiple effect humidity process which is effective at near atmospheric pressure and a temperature below the boiling point of the impure liquid at this pressure. The invention also comprises a unique apparatus, suitable for the practice of this process, having devices in which a gas is forced up through a column or tower structure packed with randomly arranged, uniformly shaped pieces of corrosive-resistant material, down through which quantities of heated, impure liquid, are passed.

For the purposes of the present disclosure, reference is made particularly to the use of packed tower structures through which brine is caused to flow countercurrent to a stream of air. A more efficient utilization of such tower structures is obtained when its packing material is placed at all points therein, and is preformed to fill up a very minimum of the tower space. As a result the material offers the brine passing thereover a large surface area from which to evaporate water. Consequently, when the air stream passes through the tower it absorbs from the brine a substantial quantity of moisture as vapor, becoming heated and saturated thereby while the brine is cooled. The saturated mixture of vapor and air formed in this manner continues to flow as a stream out of the tower from which it is directed to condensers wherein moisture is removed from the stream. Cooled concentrated brine flowing from a terminal part of the packed tower structure is also directed to the condensers where it is a coolant for the saturated mixture, absorbing the heat of condensation therefrom. Warmed brine leaving the condensers is recirculated to a heater structure where the brine is warmed to an operational temperature before it is again passed into an opening at the liquid feed end of the packed tower structure.

Application of the invention for its best effect requires that super-saturation, or wetting of the air stream is forming the air-vapor mixture passing through the packed tower, be avoided. In the event a wet saturated air-vapor mixture is produced there would be an irreversible loss of heat supplied to the mixture incident to the evaporation of moisture from the brine when there is present in the packed tower a dew point condition whereat particles of liquid from the mixture are returned to the brine. Avoidance of heat losses of the kind indicated might possibly be brought about by increasing the evaporating potential at the entrance and/or the exit of the packed tower until the evaporating potential at the center of the tower takes on positive values. However, changing the terminal conditions at the tower imposes either a serious limitation on the amount of evaporation to be obtained within the tower or a requirement for an increased temperature rise through the source providing heat to the recirculated brine. Since the number of heating effects that may be established for the method of the present invention is approximately equal to the temperature drop across the liquid in the packed tower evaporator divided by the temperature rise of the liquid across the heat source, it is evident that either expediency tends to reduce the number of effects that may possibly be achieved.

A more efficient evaporation environment for the operation in the packed tower can be perfected by making appropriate changes in the flow rate of the air-vapor mass which could otherwise pass through the tower. Accordingly, it is proposed by the present invention to modify the air-vapor flow relationship ordinarily characterizing operating conditions at predetermined points along the tower. In this manner, the magnitudes of slopes that are based on the ratio of air to liquid mass flow rates, which define lines indicative of operational relationships in the packed tower, are varied so that these operating lines closely follow the varying slope of a dry saturation curve which would be based on prevailing physical conditions in the tower. To make the changes in the flowing mass of the air-vapor mixtures that are necessary for this purpose, part of the mixture in the packed tower is bled-off at the aforementioned predetermined points and diverted directly to the condenser means. In a multi-stage apparatus adapted for the practice of the invention, a number of packed towers, evaporators and a corresponding number of condensers are interconnected by a network comprising ducts for gases and conduits for liquids. The structural size and flow capacity of each evaporator and condenser unit of this apparatus is predetermined to obtain an appropriate magnitude of operational effect therein such that bleeding-off of the air-vapor mixture can be accomplished by connections made only between the units, that is at junctures of the network joining the units.

It is therefore an object of the present invention to provide an effective method for separating impurities from a liquid medium by a procedure based upon a multiple effect evaporation.

A further object of the invention is to provide multiple-effect force draft, countercurrent flow, surface evaporator apparatus operable with a condenser system to efficiently and economically accomplish the method according to the invention.

These and other objects and advantages of the invention will be more clearly understood from the following description of the method and preferred embodiments of the invention considered together with the accompanying drawing wherein:

FIG. 1 diagrammatically shows in a flow sheet of the invention the several paths taken by liquids, gases, and mixtures involved in the method of the invention, between the various operational stations in which they are processed;

Figure 1:
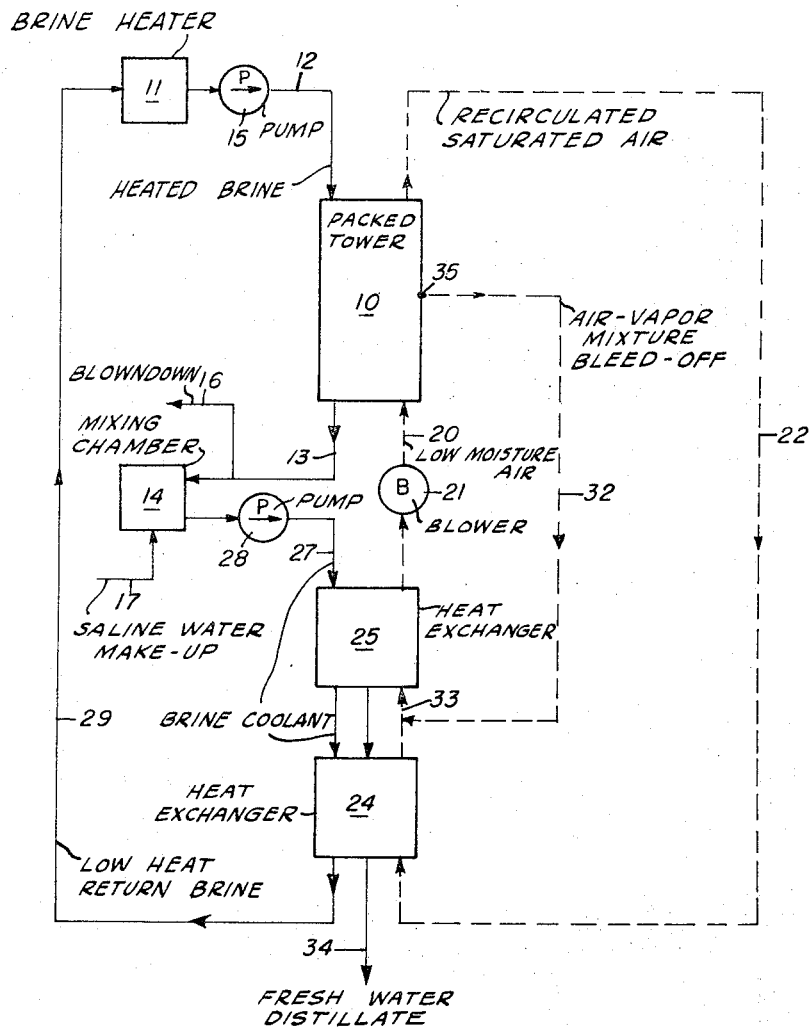

Represented by the several rectangular enclosures in the flow sheet diagram of FIG. 1, are a number of devices constituting basic components in an exemplary structural arrangement adapted to facilitate the practice of the present invention for obtaining fresh water from brine. Rectangle 10 is a packed tower which is supplied with heated brine passing through a conduit 12 joining the tower to a brine heater comprising a heat source 11. A pump 15 operates in the conduit 12, to insure the provision of sufficient brine flow into the tower to maintain a cyclic operation of the arrangement in the most efficient manner. A conduit 13 is provided to join the brine outlet of the tower 10 to a blowdown conduit 16, and a mixing chamber 14. Make up brine from an impure water source arrives in a conduit 17 which supplies the brine to the mixing chamber wherein is also received the brine output of the tower 10 which remains after the blowdown.

Adjacent to the brine outlet in packed tower 10, is connected a duct 20 providing a passage in which a relatively low moisture content air stream is directed by a blower 21 to enter the tower and flow countercurrent to the brine stream. Although this air stream is essentially saturated, its weight fraction of moisture, or absolute humidity, is at a minimum. Thus air moving up through the tower intermingles with the heated brine cascading down through the tower's packings whereby the air absorbs moisture from the packing surfaces to form a gaseous air-vapor mixture. A duct 22 connected adjacent to the brine inlet on the tower, channels heated saturated air departing the tower to a pair of heat exchangers 24 and 25. A distillate of fresh water derived from the saturated air as it passes through heat exchangers 24 and 25, is discharged through conduit 34, and collected as the product of the process. Air leaving the condenser is forced by air blower 21 to pass through duct 20 and into packed tower whereby this air is recirculated in the arrangement for use in a further cycle.

Coolant for the heat exchangers 24 and 25 is brine obtained from mixing chamber 14 by way of a conduit 27 comprising a further pump 28. The brine coolant is warmed by the heat of condensation produced in the heat exchangers, from which the brine is sent through a conduit 29, to be further heated by the heat source 11. When conditioned to a temperature suited to the process, the brine is then recirculated to packed tower 10 for another cycle of operation. A further duct 32 opening into the packed tower at a location 35, is effective to divert a portion of the air-vapor mixture passing through the tower, away from the tower and into a duct 33 which directs the mixture thus bled off into heat exchanger 25 where it is mixed with the gaseous flow leaving heat exchanger 24. Vapor carried with the bled-off portion is condensed as fresh water in heat exchanger 25 and is collected along with the product derived from the mixture completely cycled through the arrangement. Air bled-off is returned for further cyclic processing in the packed tower along with the air otherwise moving through duct 20.

Figure 2:
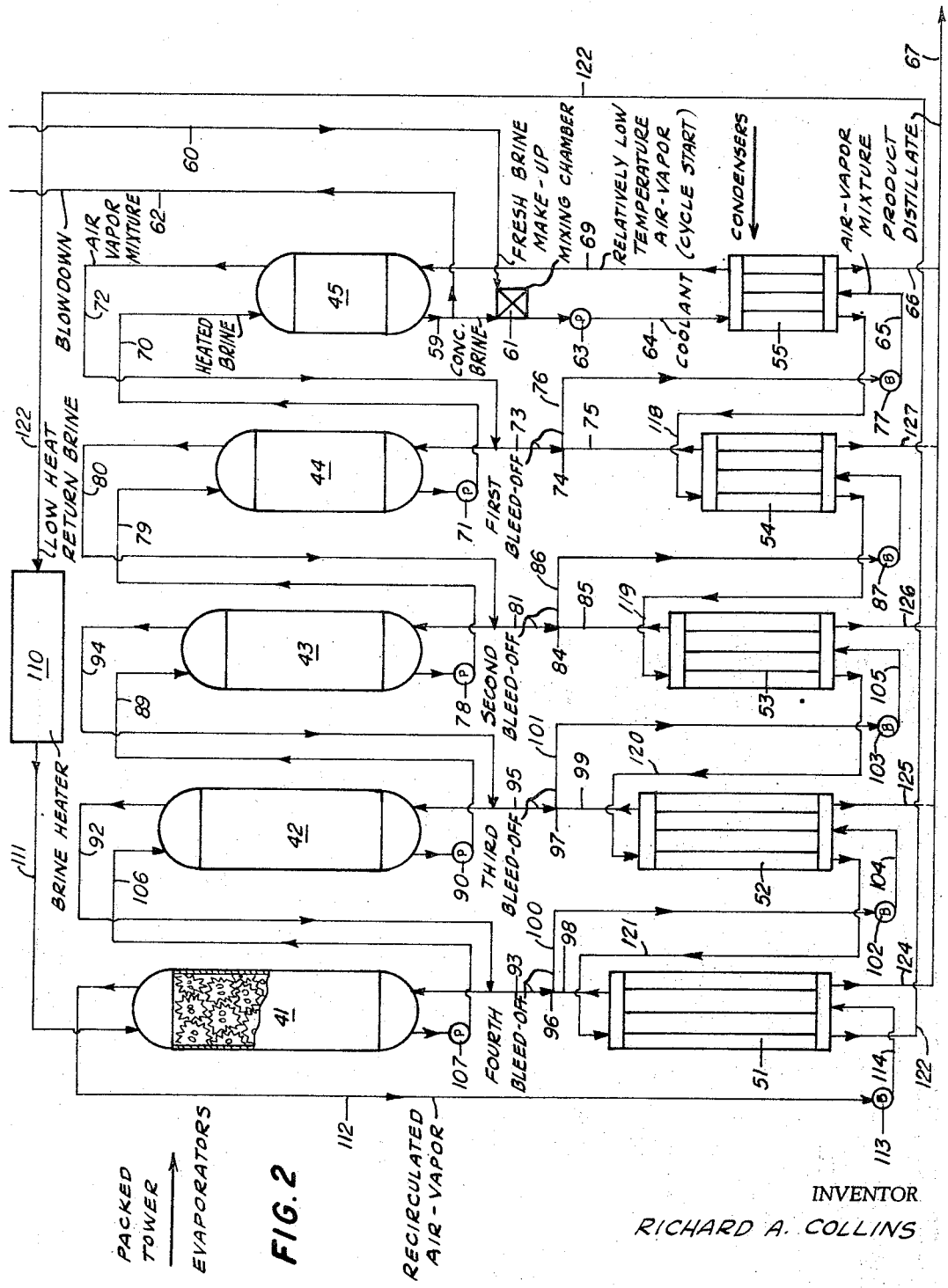
FIG. 2 is a schematic diagram illustrating a form of a structural arrangement with which the method of the invention may be practiced.

Referring now to the more detailed showing of FIG. 2, the present invention is seen as an interconnected arrangement of devices including an evaporator system comprising serially connected packed tower evaporators 41 to 45, and a correspondingly related heat exchanger system comprising tubular condensers 51 to 55. In regard to its operation, the evaporator system may be considered as constituting a functional equivalent of the unitary packed tower 10 shown in FIG. 1. However, the instant apparatus comprises four bleed-off points which in effect determine that the structural form of the system include five evaporators such that a bleed-off point will be located between each different pair of adjacent evaporators. The heat exchanger system is similarly representative of the heat exchangers 24 and 25 shown in FIG. 1, and as is evident in FIG. 2, this system's units are also structurally separated to facilitate their cooperation with the packed tower evaporators.

A measured quantity of fresh brine is fed into the arrangement of FIG. 2, by means of a conduit 60 which directs the brine to a mixing chamber 61. A supply of concentrated brine, derived from the exhaust end of the final evaporator 45, is received in a conduit 59 which also supplies a liquid input to chamber 61. However, a part of the concentrated brine from evaporator 45, not returned to the system, is released through a brine blowdown conduit 62. Consequently, sufficient fresh brine must be supplied by conduit 60 to provide a make-up feed, which in addition must be effective for maintaining the concentration of impurities in the brine leaving chamber 61 at about 4 percent. Moreover, the fresh brine feed temperature and the quantity of the brine supplied to the system must be such as to cool the brine in mixer chamber 61 to a temperature that is low enough to avoid the expenditure of additional energy for effective operation of the condensers which, as will be hereinafter more fully explained, use the output of the chamber as a coolant. A pump 63 is provided to move the brine output along a conduit 64, and into the tubular structure of condenser 55. There the coolant is effective to cause a distillate of fresh water to be derived from the air-vapor mixture supplied to the condenser through a duct 65. Product distillate is discharged from the condenser into a conduit 66 which in turn drains into a main product conduit 67 wherein the output of several feeder conduits is collected.

Air circulating in the evaporator system can be considered to exist at a cycle start condition when it is in a duct 69 which channels air from the terminal condenser 55 to the evaporator 45. This air is nearly saturated with water vapor but at a relatively low absolute humidity, and at a minimum temperature. Upon passing up through evaporator 45, this relatively low temperature air is warmed by heated brine descending through the evaporator flowing countercurrent thereto, whereupon the air picks up moisture from the brine. Heated brine for this purpose is obtained at an output connection of an evaporator 44, and delivered to evaporator 45 through a conduit 70 comprising a pump 71. A duct 72 carried an air-vapor mixture from evaporator 45 to a duct 73 which communicates with a gas inlet connection at the lower end of evaporator 44, and a juncture 74 to which are joined further ducts 75 and 76. It is the channel comprising ducts 73 and 76 which constitutes a first bleed-off connection for the instant arrangement. A portion of the air-vapor mixture output from evaporator 45 is diverted through this channel to join an air-vapor mixture supplied to duct 75 by a condenser 54, and constitute thereby the air-vapor mixture input to condenser 55. A blower 77 operates in the duct 76 to thrust the combined mixtures through the condenser wherein the mixtures' vapors are removed as fresh water.

The air-vapor mixture in duct 73 which remains after bleed-off and is supplied to evaporator 44, passes upwardly therethrough countercurrent to a flow of brine received at the top of the evaporator through a pump 78 and a conduit 79. Because of the depletion of air-vapor mixture, due to the bleed-off, and the resulting diminished rate of air mass flowing through evaporator 44, the evaporation effect is curtailed and a lesser amount of moisture is absorbed from the brine flowing in this segment of the evaporator system. Nevertheless, a duct 80 is provided to receive an air-vapor mixture output from evaporator 44, and to channel a portion thereof through a further duct 81, comprising the bleed-off connection to a second juncture 84. Merging with duct 81 at the juncture are further ducts 85 and 86, the former acting to channel the air-vapor output from heat exchanger 53 to the juncture, and the latter duct acting to direct the combined bleed-off mixture and condenser output mixture from the juncture to a blower 87 which forces these mixtures of air and vapor through duct 88 and into condenser 54. The remaining portion of the air-vapor mixture in duct 81 passes up through evaporator 43, countercurrent to a flow of brine delivered to the evaporator in conduit 89 comprising a pump 90, which constitutes the brine output connection from evaporator 42. In a corresponding manner a further juncture 97 which receives air-vapor mixtures emanating from evaporator 43, and condenser 52 in channels defined by ducts 94, 95 and 99, respectively, feeds these mixtures in combination, as an input to the condenser 53 by way of ducts 101, 105 comprising between them a blower 103. Similarly, a still further juncture 96, which receives air-vapor mixtures emanating from evaporator 42 and condenser 51 in channels defined by ducts 92, 93 and 98, respectively, feeds these mixtures in combination, as an input to the condenser 52 by way of ducts 100, 104, comprising between them a blower 102. The portion of the air-vapor mixture from evaporator 43, not disposed of by bleed-off from juncture 97, is fed into evaporator 42 countercurrent to the flow of brine supplied to the evaporator in conduit 106 connected to the output of evaporator 41 through pump 107. The portion of the air-vapor mixture from evaporator 42, remaining after the bleed-off at juncture 96, is fed into evaporator 41 countercurrent to a flow of brine coming from a heater 110 and supplied to evaporator 41 in a duct 111. An air and vapor mixture obtained from the top of this first rank evaporator 41, is characterized by a minimum air and vapor flow since the greatest part of the flow of gaseous mixture had been removed through the four bleed-off channels. This latter mixture is drawn off from the evaporator in a duct 112, by means of a blower 113, and directed through duct 114, into the condenser 51.

Brine coolant is passed from condenser 55, and delivered to condenser 54, through a conduit 118 joining the tubular passages in the respective condensers. Similar conduits 119, 120, 121, are provided to serially transfer the coolant brine between the adjacent ones of condensers 54, 53, 52 and 51. As the brine moves through these condensers, its temperature is increased by the heat of condensation which it absorbs as a coolant in the condensers. A conduit 122 connected to the output of condenser 51, eventually delivers the heated brine to heater 110 where it picks up further heat needed to facilitate its processing in the evaporators. The fresh water distillates formed in the respective heat exchangers 51 to 54 are received in output conduits 124 to 127, which as seen in FIG. 2, are connected in parallel together with the distillate output conduit 66, such that the main output conduit 67 joined thereto, is supplied with the total fresh water product.

Each of the packed towers 41 to 45, comprising the evaporators in the arrangement of FIG. 2, can take the form of an upright shell filled with loose pieces of solid material of uniform size thrown in at random. It is desirable that this packing material be of such size and shape as to provide relatively large contact surfaces and which would allow a low pressure drop through the tower. Exemplary packing materials are Raschig rings, Berl saddles, Lessing rings, Prym rings and MASPAC FN–200 plastic tower packing. Liquid distribution plates of packing support plates would also be necessary in the structure of large packed towers. Because of the small difference in temperature between the hot and cold fluids in the present invention, condensers 51 to 55 of the arrangement can be water-to-water heat exchangers of the standard shell and tube type. Comprising such heat exchangers is a horizontal tube bundle through which the brine coolant passes in countercurrent flow to the fresh water stream surrounding the tube bundle. Only the tubes in which the brine coolant is to be contained need be made of special corrosion resistant material since the outside fluid is fresh water. Centrifugal pumps of standard design can be used throughout the conduit system of the arrangement although pumps 63, 71, 78, 90 and 107 for the brine, require special materials that are resistant to corrosion. Blowers 77, 87, 103, 102 and 113, shown connected into the duct system can be of a standard centrifugal blower design. The structure for the water heater 110 can have any form which would be economically sound for the energy source available. Among the types of heat absorbers adaptable for possible utility in connection with the present invention are solar water heaters, fuel-fired water heaters, and steam ejector water heaters.

The operational characteristics of the arrangement shown in FIG. 2 can best be understood by referring to graphical and tabular data provided in FIG. 3 and the table set out hereinbelow.

| Column | A | B | C | D | E | F | G | | H | |
|---|---|---|---|---|---|---|---|---|---|---|
| Reference numeral in Fig. 2 | Mass flow rate dry air, lb. dry air/sq. ft. hr. | Mass flow rate vapor in mixture, lb. vapor/sq. ft. hr. | Mass flow rate brine, ln./sq. sq. ft. hr. | Pressure drop across piece of equipment p.s.i. | Water flow rate lb./hr. | Approx. air-vapor mixture flow rate, lb. vapor/hr. | Vapor temperature, °F. | | Brine temperature, °F. | |
| | | | Entrance and exit conditions | | | | Entrance | Exit | Entrance | Exit |
| | | | Evaporators | | | | | | | |
| 45 | 1,550 | 1,815 | 10,338 | .358 | 639,785 | 112,638 | 137.2 | 149.4 | 152.0 | 140.0 |
| 44 | 1,250 | 1,615 | 13,625 | .653 | 639,785 | 75,357 | 149.4 | 165.3 | 168.5 | 152.0 |
| 43 | 850 | 1,285 | 19,831 | .828 | 639,785 | 41,518 | 165.3 | 180.2 | 183.5 | 168.5 |
| 42 | 500 | 975 | 29,625 | .992 | 639,785 | 21,578 | 180.2 | 192.4 | 195.5 | 183.5 |
| 41 | 250 | 700 | 39,225 | .965 | 639,785 | 11,374 | 192.4 | 200.0 | 203.0 | 195.5 |
| | | | Heat Exchangers | | | | | | | |
| 51 | 250 | 700 | 39,225 | .973 | 639,785 | 11,374 | 200.0 | 192.4 | 190.5 | 198.0 |
| 52 | 500 | 975 | 29,625 | .855 | 639,785 | 21,578 | 192.4 | 180.2 | 178.5 | 190.5 |
| 53 | 850 | 1,285 | 19,831 | .674 | 639,785 | 41,518 | 180.2 | 165.3 | 163.5 | 178.5 |
| 54 | 1,250 | 1,615 | 13,625 | .517 | 639,785 | 75,357 | 165.3 | 149.4 | 147.0 | 163.5 |
| 55 | 1,550 | 1,815 | 10,338 | .328 | 639,785 | 112,638 | 149.4 | 137.2 | 135.0 | 147.0 |

Feed flow rate=116,000 lb./hr.    Blow down rate=81,300 lb./hr.    Production flow rate=34,700 lb./hr.

Figure 3:
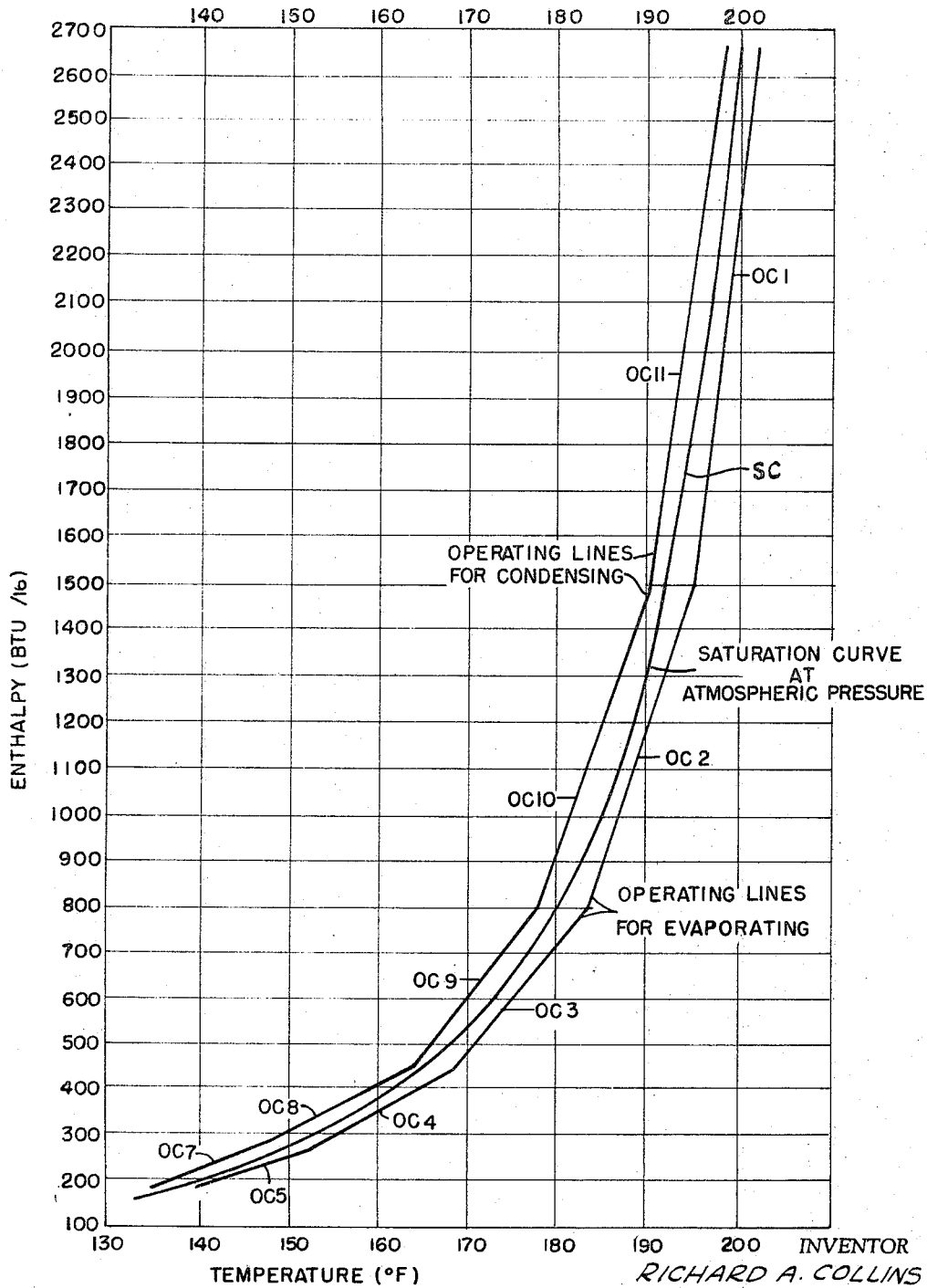
FIG. 3 is a graphical representation of a thermodynamic relationship defining the physical conditions of substances involved in the practice of the invention.

Represented by the curve SC shown in FIG. 3 is a saturation curve for conditions of atmospheric pressure, relating absolute temperatures at various points within the structural components of the arrangement to the enthalpy or heat content per pound of air-vapor mixture necessarily present at such points to obtain relatively dry saturated air. The assumption that the saturation curve is not materially affected by the pressure variations within the packed towers and heat exchangers, is valid owing to the small deviations (thermodynamically) of these pressures from one atmosphere; note patricularly the data in column D of the table. To achieve the very fine regulation of the brine feed flow and blowdown for the systems of the arrangement which would produce data reflecting operational conditions defining a smooth saturation curve like line SC, would be difficult and expensive. However, by reason of the bleed-off procedures heretofore described, the invention provides a teaching for accomplishing cyclic operational effects which can be represented by curves closely approximating that of the ideal saturation curve.

It will be noted that in FIG. 3, the saturation curve SC is followed on either side by curves comprised of a plurality of straight lines, connected end to end, representing operating curves and designated $OC_1$ to $OC_5$ and $OC_7$ to $OC_{11}$. Lines $OC_1$ to $OC_5$ on the high temperature side of curve SC can be considered to correspond to the operational conditions in the evaporator system and lines $OC_7$ to $OC_{11}$ can be similarly considered to correspond to operational conditions in the condenser system of the arrangement shown in FIG. 2. Referring to the table, in particular columns G and H thereof, and FIG. 2, it is seen that as the air-vapor mixture flows in its normal course from packed tower 45 through to packed tower 41, the temperature of the vapor which follows closely the environmental temperature determined by the brine temperature rises significantly as heat is absorbed from the brine to effectuate evaporation. However, it is the substantial decreases in the mass of air passing up through the evaporators, as indicated in the table, column A, due to removal of air between the evaporators by means of the bleed-off procedures, which correspondingly reduce the rate of evaporation, as indicated in the table, column B, whereby heat is conserved for regulating the temperatures in the equipment.

Figure 4:
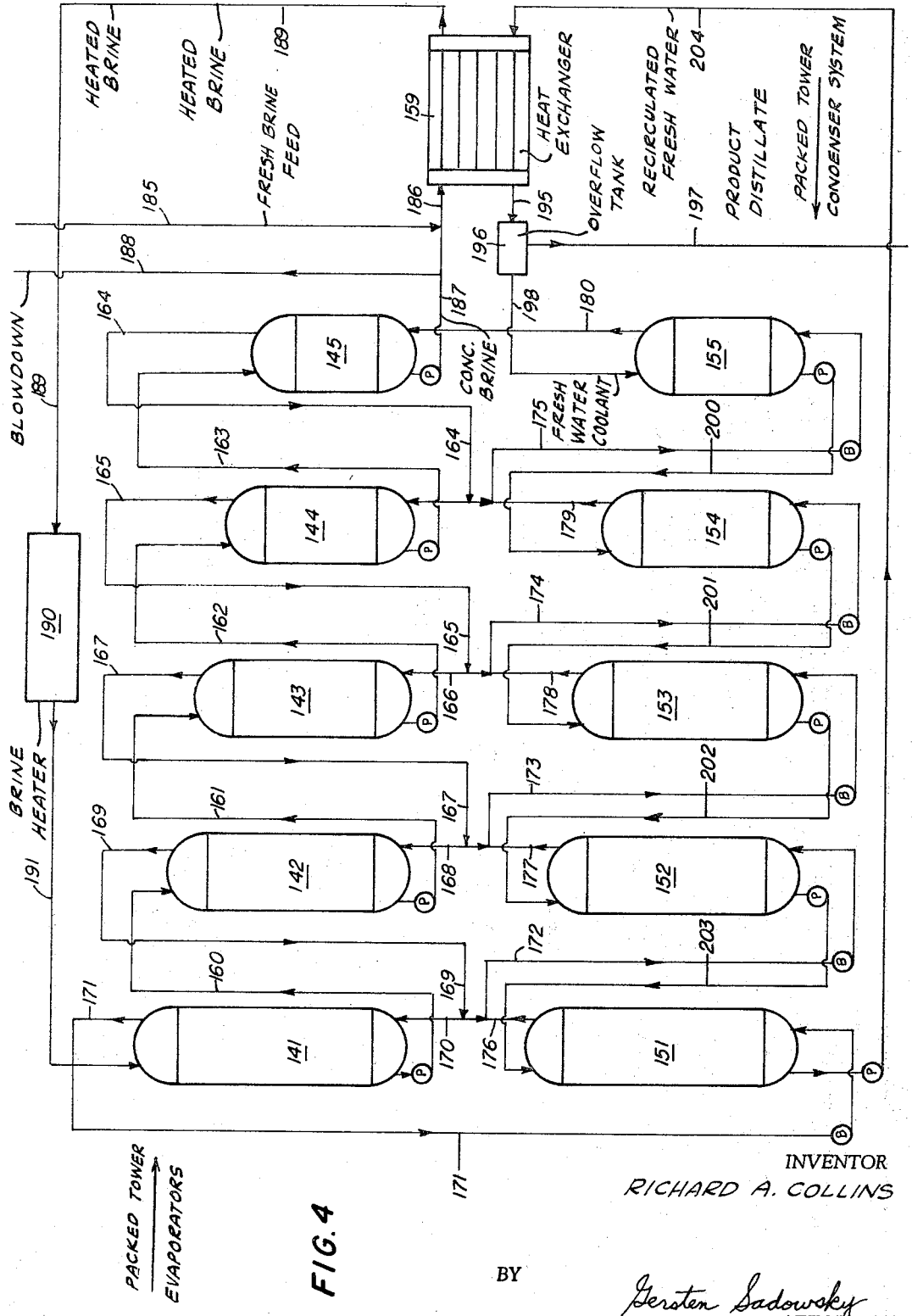
FIG. 4 is a schematic diagram illustrating a further form of a structural arrangement with which the method of the invention may be practiced.

The arrangement according to the modification of FIG. 4 is based on essentially the same cooperative relationship between an evaporator and a condensing system as was heretofore described in connection with FIG. 2. Comprising the evaporator system are a group of packed towers 141 to 145, serially connected by conduits 160 to 163 through which the heated brine is pumped for its passage down through the towers, and by ducts 164 to 170 which channels air-vapor mixture for its passage up through the towers. Chiefly distinguishing the FIG. 4 arrangement are its use of packed towers for its condensers 151 to 155, and a fresh water to brine heat exchanger 159 for obtaining heat of condensation from the condenser system and transferring such heat to the evaporator system. Air-vapor mixture is delivered to the packed tower condensers in ducts 171 to 175 by means of blowers such as were previously described. Through duct 171 passes the evaporator's terminal output of air-vapor mixture flowing from evaporator 141, and in ducts 172 to 175 are combined the bleed-off mixtures derived from packed towers 142 to 145, respectively, and the air-vapor mixture passed into ducts 176 to 179 as exhaust from individual packed tower condensers. The relatively dry gaseous mixture from condenser 155 passes into a duct 180 connecting this condenser to evaporator 145, and is thereafter cycled through the systems of the arrangement in a manner hereinbefore explained.

Brine used in the arrangement of FIG. 4 is effectively isolated from the condenser system by means of heat exchanger 159. Fresh brine feed enters the evaporator system through a conduit 185 which supplies the brine to a conduit 186 where it is combined with a portion of the evaporator system brine discharge flowing in a conduit 187. A further conduit 188 connected to discharge conduit 187, provides a passage for a brine blowdown. The relatively cool mixture of brines in conduit 186 is fed to heat exchanger 159 as a coolant for the warm fresh water derived from the condenser system. Heated brine flowing from the heat exchanger 159 is passed through a conduit 189, and received in a heater 190. After the temperature of the brine is suitably raised in heater 190, it is sent along conduit 191 to enter the packed tower 141 for further cycling through the evaporator system.

Fresh water leaving heat exchanger 159 through a conduit 195, is received in an overflow tank 196. The overflow from tank 196 flows into a conduit 197 from which the product distillate of the arrangement is collected. A second output from tank 196 flows into a conduit 198 connected to the upper input of packed tower condenser 155. The cooled fresh water supplied thereby to the condenser, flows from the packings thereof countercurrent to the flow of the air-vapor mixture blown into the condenser from conduit 175. The additional fresh water derived from the air-vapor mixture by reason of the condensation affected by the cooler input supplied through conduit 198, is pumped out of the condenser 155 along with the cooling water, and into conduit 200 through which it flows to provide a cooling fresh water input for the condenser 154. In a like manner, the fresh water received and derived in the condensers 152 to 154 is pumped along conduits 203, 202, and 201, and thus delivered to condenser 151 through which the fresh water passes to enter conduit 204 carrying this condenser output to heat exchanger 159, whereby a continuing fresh water cycle for the condenser system is accomplished. As was hereinbefore more fully explained, air-vapor mixtures derived and bled-off from the evaporator system, are fed to the individual packed tower condensers to coact with the countercurrent bow of cooling water being circulated through the condensers, such that the fresh water cycle is continuously supplied with additional water to make up for that removed as product distillate.

From the foregoing, it is evident that the lower limit of the evaporation temperatures in the practice of the present invention is a function only of the incoming contaminated water temperature. Because of the low temperatures at which productive results may be obtained using the invention, the costs of heating fuels or other heat sources applied are comparatively low. Related construction and equipment costs in this instance will also be substantially lower than that involved in high temperature or high pressure distillation apparatus, or other similar liquid purification means. The conservation of heat which the invention makes possible by using evaporators requiring no intermediate heat transfer surfaces, permits additional economies.

While preferred forms of the method and physical embodiments of the invention have been illustrated and described herein, it is understood that the invention is not limited thereby, but is susceptible to change in form and detail.

What is claimed is:

1. A method for purifying a contaminated liquid comprising the steps of heating the contaminated liquid, passing said heated liquid into an evaporator wherein it flows through a devious path, passing a stream of gas into said evaporator to flow countercurrent to the flow of said heated liquid whereby evaporation of heated liquid into the gas occurs to form a gas-vapor mixture carried along as part of the gas stream, simultaneously diverting portions of said gas stream mixture at a plurality of separated points part way along said devious path through said evaporator, to flow away from the evaporator and into channels directing said diverted portions to pass through a condenser, the remainders of said gas stream mixture continuing to flow countercurrent to the flow of said heated liquid whereby additional vapor from the liquid is absorbed into the remainders of said gas stream, and at the end of said devious path through said evaporator directing the gas stream mixture out of said evaporator and into a channel through which said end gas stream mixture traverses the condenser, collecting the purified liquid produced by the condensation of the vapor in said gas stream mixtures passing through the condenser, directing the vapor depleted gas stream discharged from the condenser into said evaporator to flow countercurrent to the flow of said heated liquid, channeling said heated liquid passed completely through said evaporator into a chamber, channeling a fresh supply of contaminated liquid into the chamber to mix with the liquid therein from the evaporator, directing said mixed contaminated liquids to pass through said condensers so as to flow therethrough out of contact with said stream mixtures passing therein, and countercurrent thereto, whereby the mixed contaminated liquids are heated by the heat of condensation, channeling said heated contaminated liquids to a heater, and passing them through the heater to further raise their temperature whereby the contaminated heated liquids are properly conditioned to be channeled into said evaporator to flow through said devious path provided therefor.

2. The method of claim 1, comprising the further steps of channeling only a portion of the contaminated liquid passed through the evaporator, into the mixing chamber, and wasting the remainder of such liquid.

3. An arrangement for the purification of a contaminated liquid comprising an evaporator system including a plurality of evaporator packed tower units and a multiplicity of conduits and ducts serially interconnecting the said plurality of evaporator units, whereby said conduits provide a channel in which the contaminated liquid flows from an initial evaporator unit to a terminal evaporator unit of said evaporator system, and said ducts provide a channel in which a gaseous mixture comprising vapors evaporated from the contaminated liquid flows from said terminal unit to said initial unit for direct contact with contaminated liquid flowing in the evaporator units, a condenser system including a plurality of condenser units and a first multiplicity of fluid passage means serially interconnecting said plurality of condenser units, said first multiplicity of fluid passage means comprising ducts providing a channel in which the said gaseous mixture exhausted from said initial evaporator unit flows into an initial condenser unit of said condenser system, and a further channel in which said mixture flows from the said initial condenser unit to a terminal condenser unit of said condenser system, a second multiplicity of fluid passage means comprising a plurality of separate passages which individually provide a separate channel for gaseous mixture to flow directly from a respective one of said evaporator units to a respective one of said condenser units, said first multiplicity of fluid passage means comprising a further multiplicity of conduits serially interconnecting said condenser units, and heat transfer means, the latter being cooperatively associated with said further multiplicity of conduits and said conduits of said evaporator system to heat the contaminated liquid flowing in said evaporator system.

4. The liquid purification arrangement of claim 3 wherein each condenser unit comprises heat transfer surfaces maintaining said gaseous mixture passing through said condenser system in said first multiplicity of fluid passage means, out of contact with the contaminated liquid flowing in said condenser system through said further multiplicity of conduits, and transmitting the heat of condensation of said vapors in the gaseous mixture to said contaminated liquid, and said heat transfer means comprising a heater, the latter receiving and further heating the output of contaminated liquid from said condenser system to provide an input of heated contaminated liquid to said initial evaporator unit.

5. The liquid purification arrangement of claim 4 wherein means comprising a further fluid passage operatively connected to said condenser units, channeling purified liquid out of said arrangement as a product distillate, and further means connected to said terminal evaporator unit and said terminal condenser unit, comprising additional fluid passages in which contaminated liquid is withdrawn from said arrangement, and fresh contaminated liquid is supplied to said arrangement.

6. The liquid purification arrangement of claim 5 wherein said heat transfer means comprises a heater and heat exchanger comprising heat transfer surfaces, further fluid passage means connecting the heater to said initial evaporator unit and to said heat exchanger providing a channel for contaminated liquid from the evaporator system to flow through said heat exchanger, and additional fluid passage means connecting said initial and terminal condenser units to said heat exchanger providing a channel for purified liquid from the condenser system to flow through said heat exchanger wherein said heat transfer surfaces maintain the liquid from said evaporators out of contact with the liquid from said condenser system, and facilitates transfer of the heat of condensation of said vapors in said condenser system to said contaminated liquid of said evaporator system, said heater further heating the contaminated liquid from the heat exchanger to provide through said further fluid passage means an input of heated contaminated liquid to said initial evaporator unit.

7. The liquid purification arrangement of claim 6 wherein additional conduits connected to said further fluid passage means provide channels in which contaminated liquid is withdrawn from said evaporator system and fresh contaminated liquid is supplied to said evaporator system, a fluid flow regulating means connected to said heat exchanger to receive said purified liquid flowing therethrough in heat exchange relationship with said contaminated liquid of said evaporator system, and a further additional conduit connected to said regulating means to provide a channel in which a regulated flow of purified liquid passes out of said arrangement as a product distillate.

8. An arrangement for purifying a contaminated liquid comprising an evaporator means, a condenser means and a heater means, said evaporator means having a hollow column containing packing material of substantially uniform size providing multitudinous exposed surfaces, a first conduit means providing a channel for a flow of liquid between said heater means and said evaporator means, said heater means heating contaminated liquid supplied thereto and providing through said first conduit means said heated contaminated liquid to said evaporator means, a second conduit means providing a channel for a flow of liquid between said evaporator means and said condenser means, a chamber connected to said second conduit means, receiving a supply of fresh contaminated liquid and contaminated liquid from said evaporator means to mix therewith, and supplying said mixture to said condenser means, a third conduit means connecting said condenser means to said heater means, said third conduit means providing a channel for contaminated liquid to flow from said condenser means to said heater means, a first duct means directing a stream of gas from said condenser means to said evaporator means to flow along a path through said evaporator means countercurrent to the flow of said contaminated liquid along said path wherein said gas and liquid contact said exposed surfaces, and whereby the gas stream carries vapor out of said liquid to form a stream of gas-vapor mixture, a second duct defining a passage between said evaporator means at a point partially along said flow path therein and said condenser means, wherein a portion of said stream of gas-vapor mixture is directed out of said evaporator means and into said condenser means, and a third duct defining a passage from a point at the end of said flow path in the evaporator means to the condenser means wherein the remainder of said stream of gas-vapor mixture is directed out of said evaporator means and into said condenser means, and a fluid passage means connected to said condenser means in which a product distillate of purified liquid formed by condensation the vapor in said gas-vapor mixture passes out from said arrangement.

References Cited

UNITED STATES PATENTS

| | | | |
|---|---|---|---|
| 2,863,808 | 12/1958 | Markels | 202—153 X |
| 2,946,726 | 7/1960 | Markels | 202—158 X |
| 3,105,020 | 9/1963 | Silver et al. | 202—173 X |
| 3,111,462 | 11/1963 | Silver | 202—173 X |
| 3,206,379 | 9/1965 | Hill | 203—49 X |
| 3,214,348 | 10/1965 | Lichtenstein | 203—49 X |
| 3,214,351 | 10/1965 | Lichtenstein | 203—49 X |
| 3,219,552 | 11/1965 | Starmer | 202—173 |

NORMAN YUDKOFF, *Primary Examiner.*

D. EDWARDS, *Assistant Examiner.*